3,257,800
PROPELLANT FLOW CONTROL SYSTEM
Herbert R. Lawrence, Atherton, and Daniel S. Goalwin, Los Altos, Calif., assignors to United Aircraft Corporation, East Hartford, Conn., a corporation of Delaware
Filed Feb. 1, 1963, Ser. No. 255,458
7 Claims. (Cl. 60—35.3)

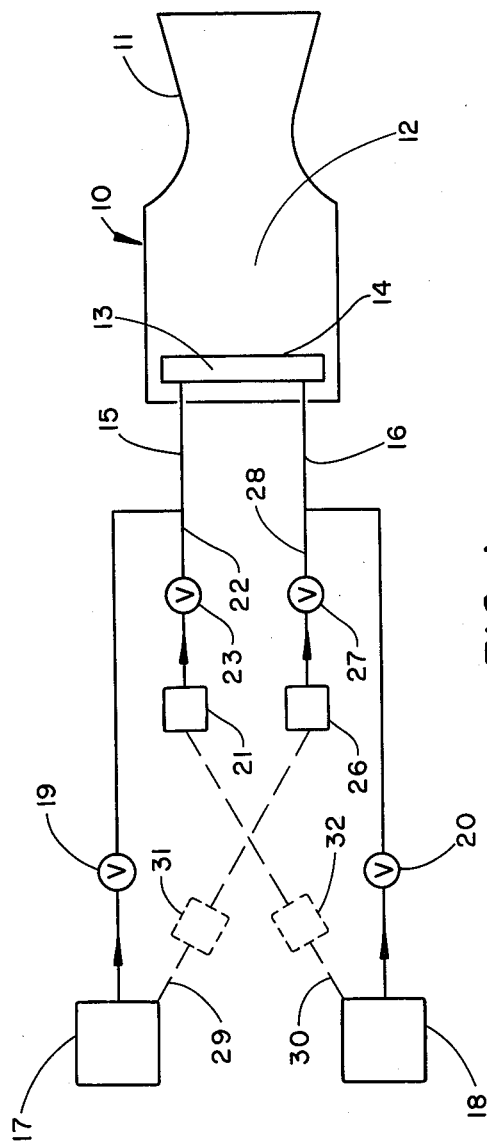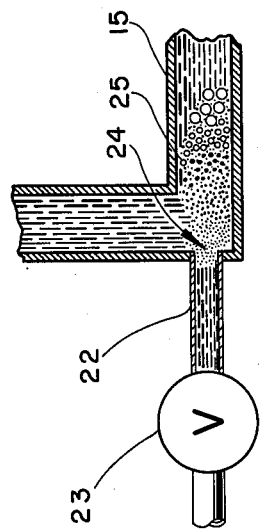

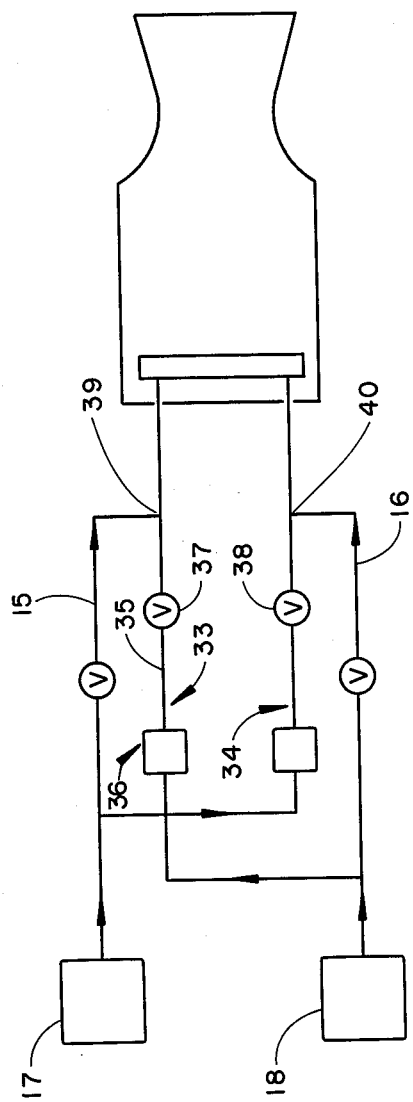
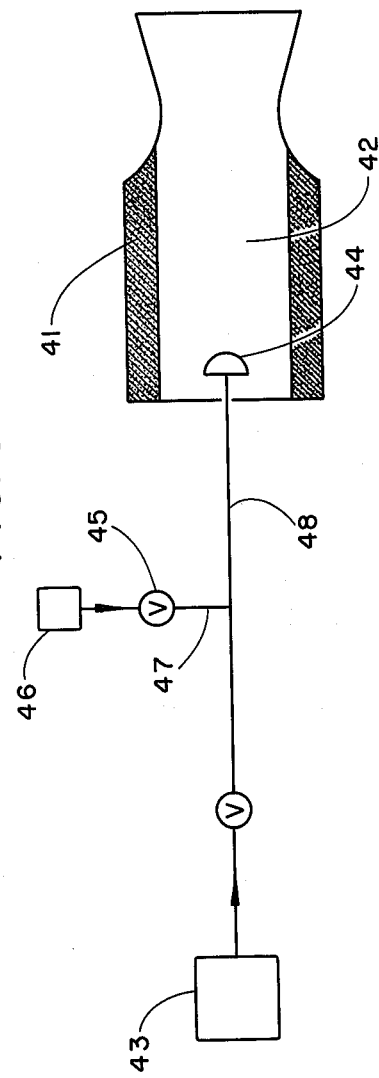

The present invention relates to a method for controllably varying the mass rate of flow of a confined liquid stream while maintaining a substantially constant fluid-flow velocity and more particularly to a method of controllably effecting a wide range of thrust requirements in liquid and hybrid reaction motor systems.

In the use of reaction motors, the need often arises to modulate or vary the thrust of the engine in a smooth and continuous manner for the purpose of undertaking any one of a number of space maneuvers such as, for example, trajectory or orbital correction. In the future, space missions such as orbital rendezvous and lunar landings calling for precise and accurate vehicle control will require propulsion systems having highly reliable thrust variability. To accomplish the exacting requirements which manned space travel will impose, there are several propellant flow-control systems now available to produce the desired thrust variability. For example, currently the present general practice for varying the mass rate of flow of liquid propellant entering the combustion chamber is to control injector area and/or injection pressure. However, variable area injectors are inherently complex and, because of their susceptibility to heating at the injector face, are confronted with serious reliability problems. Moreover, a system relying on variation of injection pressure to modulate the thrust level results in unstable mixing with a resultant decrease in combustion performance.

More recently, it has been proposed to inject an inert gas into the feed lines of the liquid propellant in order to produce a foam whereby the mass rate of flow is decreased without relying on the aforementioned systems of orifice area control or pressure control. However, carrying an inert gas for dilution of the propellant has the disadvantage of reducing the vehicle payload without adding to its thrust capability. Further, the employment of systems dependent upon a source of inert gas for aeration requires the carrying of a substantial surplus of gas in the event situations arise where sustained low thrust is necessary; or, in a system where the liquid propellant storage tanks are pressurized by an inert gas from a common source, a danger exists that sustained low-level thrust will completely deplete the gas source while considerable quantities of propellants still remain unused. Such an occurrence would put the vehicle in the unfortunate position of having substantial quantities of propellant available but no way of using it.

The general purpose of this invention is to provide a method for accurately and continuously varying the thrust level of a liquid or hybrid reaction motor over a wide range which embraces all the advantages of similarly employed methods and possesses none of the aforesaid disadvantages. To attain this, the present invention constitutes, basically, a method for selectively and continuously regulating the mass rate of flow of the propellant as it passes through its feed lines by injecting therein a chemically reactive material. By so doing, the reaction products aerate the propellants to reduce its bulk density.

An object, therefore, of the present invention is to provide a method for aeration throttling of liquid propellant reaction motors by injecting reactive materials into the propellant.

A further object is to provide a thrust modulation system employing two phase flow of propellant and combustion products.

Another object is to provide a method for thrust modulation which is continuously variable.

Another object is the provision of a method for thurst modulation which realizes high injection velocity over a wide range of thrust levels.

A further object is to provide a method for thrust modulation which achieves high combustion performance.

Yet another object is to provide a method for thrust modulation with a minimum of specific impulse degradation.

Still another object is to provide a method for thrust modulation which requires low bulk and low weight equipment for its implementation.

A still further object is to provide a method for aeration throttling that assures full utilization of propellants without using a surplus of injectant.

Still another object is the provision of a method of aeration throttling wherein combustion instability is eliminated.

Other objects and many of the attendant advantages of this invention will be readily appreciated as the same becomes better understood by reference to the following detailed description when considered in connection with the accompanying drawings in which like reference numerals designate like parts throughout the figures thereof and wherein FIG. 1 diagrammatically illustrates a preferred embodiment of a bi-propellant reaction motor system of the present invention.

FIG. 2 is an exploded cross-sectional view of one of the injection points in FIG. 1.

FIG. 3 is a diagrammatic illustration of a preferred embodiment of a hypergolic bi-propellant reaction motor system of the present invention.

FIG. 4 is a diagrammatic illustration of a preferred embodiment of a hybrid reaction motor system of the present invention.

Referring now to the drawings, FIG. 1 diagrammatically depicts an exemplary propulsion system utilizing the unique aeration method of the present invention. This system employs a conventional rocket engine thrust chamber 10 comprised of a nozzle 11, a combustion chamber 12, and an injector 13. The injector 13 has a face 14 with separate orifices for the separate injection of a liquid fuel and liquid oxidant which reacts in the combustion chamber to produce a high temperature working fluid to propel the rocket system. To provide the injector 13 with the liquid fuel and oxidant, feed lines 15 and 16, respectively, are connected from a fuel storage tank 17 and an oxidant storage tank 18. The fuel and oxidant may be caused to flow into the lines 15 and 16 by any number of devices not shown in the drawing such as pressurizing storage tanks 17 and 18 with a gas or, alternatively, placing feed pumps in lines 15 and 16. An example of a preferred propellant system is the use of ethyl alcohol as a fuel and nitrogen tetroxide as an oxidant.

To practice the method of the present invention, valve 19 is opened to admit ethyl alcohol from tank 17 through line 15 into the injector 13 and valve 20 is opened to flow the nitrogen tetroxide from tank 117 through lin 16 into the injector 13 where both fuel and oxidant are injected into the combustion chamber 12 for ignition and combustion. If necessary in a specific system which is non-hypergolic, a suitable igniter may be provided to initiate the reaction. Assuming the thrust engine is now performing at its maximum thrust level and it becomes necessary to reduce the thrust level, the present invention reduces the mass rate of flow of the propellants in the feed lines by reducing the bulk density of the propellants they contain. For example, the bulk density of ethyl alcohol in feed line 15 is reduced by injecting minute quantities of hypergolic red fuming nitric acid contained in tank 21 into feed line 15 whereupon a controlled reaction occurs providing a two-phase mixture in line 15 comprised of ethyl alcohol and gaseous combustion products. The quantity of red fuming nitric acid admitted into the feed line 15 is regulated by valve 23, according to the requirements of the specific maneuver. The necessary driving force to inject the reactive material may be supplied by means similar to that which impels the propellants from their respective supply tanks.

Referring now to FIG. 2 where the general region of injection is shown in greater detail, red fuming nitric acid flows into the ethyl alcohol at point 24 whereupon a reaction occurs to form a gaseous combustion products. The thus formed gas then reacts to form a multitude of small bubbles 25 in the ethyl alcohol, thereby reducing its bulk density. As a consequence, the two-phase fluid mixture supplies the combustion chamber with ethyl alcohol at a decreased rate and the thrust is accordingly reduced. Similarly, the bulk density of the oxidant, nitrogen tetroxide, may be reduced by opening valve 27 to admit the reactive material such as hydrazine into line 28 which communicates with the feed line 16. By regulating control valves 23 and 27 with appropriate control means, the bulk density of the propellants can be continuously varied over a wide range providing the rocket system with a wide variation of thrust capabilities. In the event the main propellant tanks 17 and 18 are emptied on a particular mission, but reserves of reactive injectants remain in tanks 21 and 26, these reactive materials, constituting an oxidant and a fuel respectively, can be directed to the injector 13 for combustion. Consequently, the two reaction-material storage tanks can be made of sufficient capacity to provide an emergency reserve in the event of depletion or failure of the main propellant system. In addition, when tanks 21 and 26 contain hypergolic propellants, these propellants may be injected first to initiate combustion and thereby serve an additional role as a system igniter.

In the event a hypergolic bi-propellant system is used, such as providing storage tank 17 with hydrazine and tank 18 with nitrogen tetroxide, the injectant tanks 21 and 26 may be supplied by cross-feed lines 29 and 30 containing appropriate fluid pumping means 31 and 32. For example, storage tank 21 is provided with a supply of nitrogen tetroxide and, according to the thrust demands of the mission, the hydrazine stream flowing through line 15 is appropriately aerated by opening valve 23 to inject nitrogen tetroxide which reacts with the hydrazine in the main feed line 15. However, as the supply of nitrogen tetroxide becomes depleted in tank 21, replenishment can be effected by flowing oxidant from the main supply tank 18 through cross feed line 30. Likewise, the hydrazine supply in tank 26 can be kept at an appropriate level by cross feed line 29. In this way, the injectant tanks 21 and 26 can be substantially reduced in size since the entire supply for the mission need not be contained in these tanks.

FIG. 3 shows an alternative method of providing reactive injectants in the propellant feed lines of hypergolic bi-propellant systems. Assuming tank 17 contains hydrazine as a fuel and tank 18 contains nitrogen tetroxide as an oxidant, aeration of the respective propellant streams in feed lines 15 and 16 is accomplished by injecting predetermined quantities of nitrogen tetroxide by means of cross-feeding system 33 into line 15 and hydrazine by means of cross-feeding system 34 into line 16. These cross-feeding systems, 33 and 34, can take many forms; but, essentially, they require conduit means such as 35 for carrying the injectant to the appropriate feed line and control means 37 for selectively adjusting the quantity of reactive material injected into the feed line. Also, to prevent accidental back-flow of propellant into the opposite feed line via a cross-feed system, a check valve such as 36 may be employed in the cross-feed system.

The method of thrust modulation by aeration, as exemplified by the hypergolic system of FIG. 3, would be carried out by merely regulating control means 37 and 38 to cross-inject predetermined quantities into the propellants at points 39 and 40 to aerate the main propellant streams. This system requires no secondary source of reactive material for injection into the main feed lines and, consequently, reduces the weight requirements of the system.

In FIG. 4, there is shown a hybrid system wherein the principle of the instant invention is used to effect thrust variability. In this system, a grain 41 is located along the wall of the combustion chamber 42. Assuming the grain is comprised of a fuel, the supply tank will contain an oxidant which is sprayed into the combustion chamber by injector 44. To vary the bulk density of the propellent, valve 45 is opened to admit an appropriate quantity of fuel-base injectant from tank 46 to flow through conduit 47 and into oxidant feed line 48. The mass rate of flow of the oxidant is varied according to the setting of valve 45, thereby controlling the degree of combustion of the grain 41 to modulate the thrust of the engine. In a similar manner, it is clear that a liquid mono-propellant system is amenable to thrust modulation by the present propellant aeration technique.

It is readily apparent from the foregoing decription of exemplary systems employing the principles of the instant invention that a small quantity of reactive injectant can create a comparatively large quantity of gaseous combustion products to aerate the propellant stream, thus providing a system imposing relatively insignificant bulk and weight demands. Because the quantity of reactive materials injected into the propellant stream can be varied in a continuous manner, the thrust levels between no aeration and maximum aeration are continuously variable. By selecting suitable propellants and injectants, the system characteristics, insofar as controllability, range of thrust level, specific impulse, and total impulse are concerned, may be modified to meet the demands of a particular mission. The individual propellants and injectants utilized may be comprised of a mixture of oxidants or fuels which may take any physical state or chemical composition suitable to achieve the desired effects. For example, in certain instances it is desirable to use solid or gaseous materials as the reactive injectant. Although in general the reactive material suitable for injection into a propellant to produce gaseous combustion products therein will constitute a material normally recognized in the art as hypergolic to said propellant, the term "reactive material" is intended to include any material capable of producing bubbles of reaction products on contact with the propellant. The term "aeration," as used herein, is intended to include any two-phase mixture of gas and liquid including foam.

Obviously, many modifications and variations of the present invention are possible in light of the above teaching. The structural systems described for carrying out the method of the present invention are merely exemplary and many alternative structural forms may be employed for the practice of the instant invention. It is, therefore, to be understood that, within the scope of the appended claims, the invention may be practiced otherwise than as specifically described.

Having thus described the invention, what is claimed is:

1. A method of controlling the mass flow rate of a liquid comprising selectively injecting into said liquid flowing through a pipe a predetermined quantity of a reactive material to react with part of said liquid to produce a mixture of gaseous reaction products and said liquid, whereby the liquid is aerated to reduce its bulk density and thereby selectively vary its mass flow rate.

2. A method for effecting thrust level control in a reaction motor having a liquid propellant feed line, comprising flowing a liquid propellant through said feed line, injecting a predetermined quantity of reactive material into said liquid propellant to produce a mixture of gaseous reaction products and said liquid propellant in said feed line, and combusting said mixture in said reaction motor.

3. A method for selectively modulating the thrust level of a reaction motor utilizing at least one liquid propellant comprising selectively injecting a reactive material into said liquid propellant upstream of the point of injection into the reaction motor to produce gaseous reaction products which form a mixture of said gaseous reaction products and said liquid propellant to reduce the bulk density of said propellant and combusting said mixture in said motor whereby the thrust level is selectively modulated according to the quantity of reactive material injected into said propellant.

4. A method for selectively modulating the thrust level of a reaction motor having a combustion chamber comprising providing a liquid propellant source, flowing said liquid propellant to said combustion chamber, providing a reactive material source, selectively injecting said reactive material into the flowing liquid propellant to form gaseous reaction products in said liquid to produce a mixture of gases and said liquid propellant, and combusting said mixture in said combustion chamber.

5. A method for selectively modulating the mass rate of flow of a liquid propellant flowing to the combustion chamber of a reaction motor comprising generating gaseous combustion products, aerating said liquid propellant with combustion products to reduce the bulk density of the liquid propellant, and combusting said aerated liquid propellant in said combustion chamber.

6. A method for selectively modulating the thrust level of a liquid propellant reaction motor comprising generating gaseous combustion products, aerating the liquid propellants with the combustion products to reduce the bulk density thereof and combusting said liquid propellant of reduced bulk density whereby the thrust level of the reaction motor is reduced.

7. A reaction motor having a wide range of thrust level capability comprised of a thrust chamber, a liquid propellant source, a first pipe means conductively connected between said thrust chamber and liquid propellant source, a reactive material source reactive to said liquid propellant, a second pipe means connected from said reactive material source to said first pipe means immediately upstream of said thrust chamber, valve means selectively metering a controlled quantity of said reactive material flowing into said first pipe means whereby combustion products are formed in said first pipe means to aerate the propellant contained therein.

References Cited by the Examiner
UNITED STATES PATENTS

| | | | |
|---|---|---|---|
| 2,683,963 | 7/1954 | Chandler | 60—35.6 |
| 3,040,520 | 6/1962 | Rae | 60—35.6 |
| 3,045,424 | 7/1962 | Morrell | 60—35.6 |
| 3,128,601 | 4/1964 | Abild | 60—35.6 |
| 3,143,855 | 8/1964 | Abild | 60—35.6 |

MARK NEWMAN, *Primary Examiner.*

ABRAM BLUM, SAMUEL LEVINE, *Examiners.*

S. N. GARBER, D. HART, *Assistant Examiners.*